United States Patent
Khaleghi et al.

(10) Patent No.: US 10,211,920 B1
(45) Date of Patent: Feb. 19, 2019

(54) LATENCY BASED CHROMATIC DISPERSION ESTIMATION METHODS

(71) Applicant: Amazon Technologies, Inc., Seattle, WA (US)

(72) Inventors: Salman Khaleghi, Seattle, WA (US); Emily Abbess, Seattle, WA (US); Alaa Adel Mahdi Hayder, Seattle, WA (US); Matthew Connolly, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/698,356

(22) Filed: Sep. 7, 2017

(51) Int. Cl.
| | |
|---|---|
| *H04B 10/2525* | (2013.01) |
| *H04B 10/071* | (2013.01) |
| *H04B 10/079* | (2013.01) |
| *H04Q 11/00* | (2006.01) |
| *H04J 14/02* | (2006.01) |

(52) U.S. Cl.
CPC ..... *H04B 10/25253* (2013.01); *H04B 10/071* (2013.01); *H04B 10/0793* (2013.01); *H04J 14/0212* (2013.01); *H04Q 11/0066* (2013.01); *H04Q 2011/0016* (2013.01); *H04Q 2011/0083* (2013.01)

(58) Field of Classification Search
CPC ............ H04B 10/25253; H04B 10/071; H04B 10/0793; H04J 14/0212; H04Q 11/0066; H04Q 2011/0016; H04Q 2011/0083; G01M 11/3163; G01M 11/3109
USPC ............................................................ 398/16
See application file for complete search history.

(56) References Cited

U.S. PATENT DOCUMENTS

| | | | | |
|---|---|---|---|---|
| 5,956,131 | A * | 9/1999 | Mamyshev | G01M 11/3163 250/227.18 |
| 6,882,410 | B2 * | 4/2005 | Asahina | G01M 11/3127 356/73.1 |
| 7,042,559 | B1 * | 5/2006 | Frigo | G01M 11/3127 356/73.1 |
| 2002/0107655 | A1 * | 8/2002 | Aoki | G01M 11/3127 702/127 |
| 2007/0258721 | A1 * | 11/2007 | Boduch | H04B 10/071 398/147 |
| 2007/0274712 | A1 * | 11/2007 | Leppla | G01M 11/332 398/20 |
| 2008/0019693 | A1 * | 1/2008 | Sorin | H04Q 11/0067 398/71 |
| 2013/0038879 | A1 * | 2/2013 | Dorize | G01M 11/3118 356/445 |
| 2015/0229410 | A1 * | 8/2015 | Magri | H04B 10/25133 398/26 |
| 2016/0197673 | A1 * | 7/2016 | McClean | H04B 10/07955 398/38 |

* cited by examiner

*Primary Examiner* — Dalzid E Singh
(74) *Attorney, Agent, or Firm* — Klarquist Sparkman, LLP

(57) ABSTRACT

Optical communication systems include optical time domain reflectometers that are coupled to link fibers to determine link fiber lengths. After length measurement, chromatic dispersion associated with the measured length is estimated. In some examples, the estimated chromatic dispersion is compensated. A single OTDR can be used to assess a pair of link fibers coupling first and second network nodes by injecting a probe pulse at a common end of the link fibers or by routing the probe pulses from a remote end of one link fiber into a remote end of a second fiber.

18 Claims, 14 Drawing Sheets

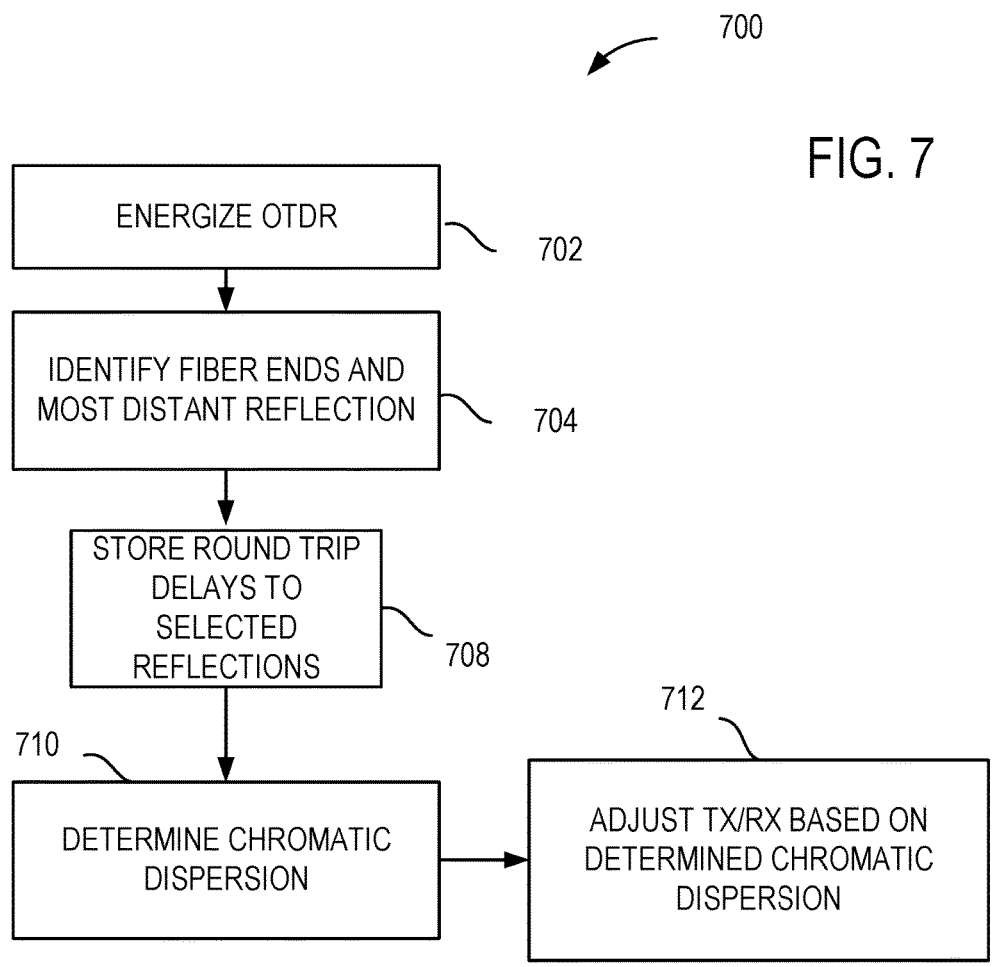

LATENCY BASED CHROMATIC DISPERSION ESTIMATION METHODS

BACKGROUND

Cloud computing services that serve large numbers of users can require multiple server systems and very high data rate communication connections among data centers that are separated by distances that are typically as much as 10 km to 150 km or more. As a result, optical fiber communications systems have been deployed to provide the necessary communication connections as such systems provide low signal losses and high bit rates. To take advantage of the wide bandwidth offered by fiber-based systems, single mode fiber connections are provided and wavelength division multiplexing (WDM) techniques are used in which multiple wavelengths carry independent data streams. However, at typical separation distances required by cloud service provides, fiber chromatic dispersion can limit available data rates.

BRIEF DESCRIPTION OF THE DRAWINGS

FIG. 7 illustrates a representative method of adjusting CD in an optical fiber communication system.

DETAILED DESCRIPTION

Figure 1:
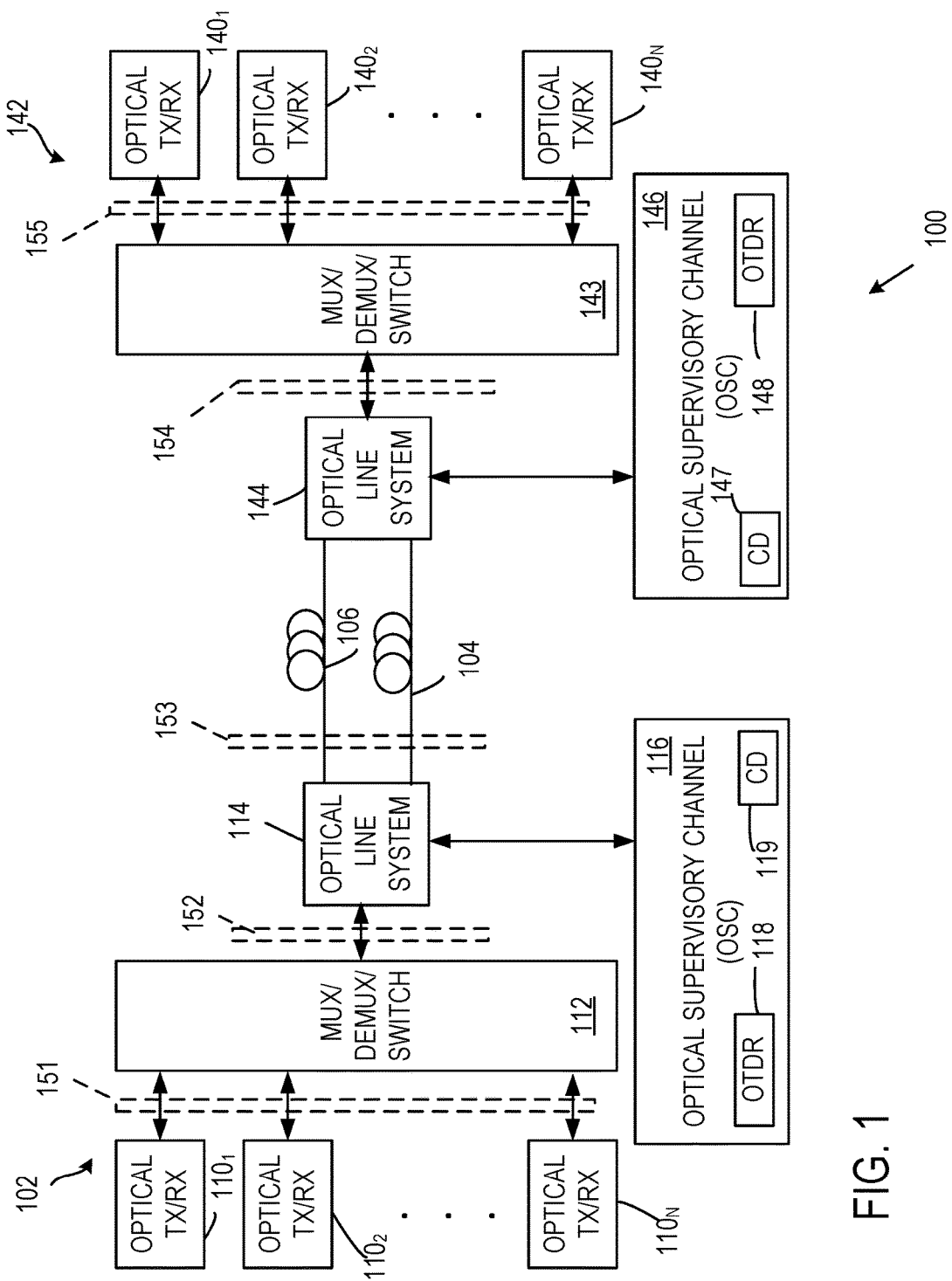
FIG. 1 illustrates a representative optical communication system that includes an optical time domain reflectometer to assess fiber lengths and permit chromatic dispersion compensation.

The following description is directed to technologies for determination of chromatic dispersion (CD) in optical fiber communication systems using optical time domain reflectometry. OTDRs can be coupled to or incorporated into an optical communication system to obtain estimates of optical fiber lengths. CD characteristics of a particular fiber type are combined with the length estimates to produce estimates of total CD in one or more optical fibers. Based on the estimated total CD, CD compensation can be applied, or bit rate, modulation format, or other communication characteristic modified appropriately. CD compensation can be applied to individual wavelength channels or to multiwavelength, combined beams. CD compensation can be applied using optical or electrical CD compensation, or a combination thereof. In some cases, a combination of optical and electrical CD compensation is used. If OTDR functionality is built into a communication network, CD can be routinely monitored or evaluated after network repair or modification.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest," "best," "minimum," or the like. It will be appreciated that such descriptions are intended to indicate that a selection among many useful functional alternatives can be made, and such selections need not be better, smaller, or otherwise preferable to other selections.

As used herein, "optical signal" refers to propagating electromagnetic radiation, typically at wavelengths between about 200 nm and 2 µm. In most practical examples, signal wavelengths are between 700 nm and 1700 nm. Typically, optical signals are modulated based on data to be communicated. "Detected" optical signal refers to an electrical signal produced in response to an optical signal delivered to a photodetector. In some examples, wavelengths are at or near 1550 nm and correspond to wavelengths used in wavelength division multiplexed (WDM) communication systems or so-call dense WDM (DWDM) systems. At least some of the disclosed embodiments can also be used with coarse wavelength division multiplexing (CWDM) systems, in which case the wavelengths may be about 1310 nm. CWDM systems may be particularly useful for short-reach applications (e.g., on the order of tens or hundreds of meters, such as within a data center). Although not specifically noted in the following, signal propagation is largely confined to optical waveguides such as optical fibers, silica-on-silicon waveguides, or waveguides in GaAs, InGaAs or other materials. "Link fiber" refers to a length of optical fiber that couples a transmitter and a receiver that are not located at the same place. Optical signals at different wavelengths define different wavelength channels, referred to herein also simply as "channels" or "optical channels." While channels are associated with a specific wavelength such as a center wavelengths, the associated optical beams also have spectral widths selected to control channel overlap. Typically, an optical beam associated with a particular wavelength can be modulated, transmitted, and detected independently of other wavelengths (channels) in a multi-channel beam. As disclosed herein, chromatic dispersion (CD) is estimated using fiber characteristics and single-ended pulse propagation delays. After estimation, CD compensation can be applied to reduce or eliminate pulse spreading due to CD, and to improve bit error rate or otherwise achieve acceptable performance.

While the disclosed methods and apparatus can be used in a variety of optical communication systems, in one example, the disclosed approaches can be used in data center communications such as those using pulse amplitude modulation (PAM), phase shift keying (PSK), quadrature amplitude modulation (QAM), orthogonal frequency division multiplexing (OFDM), discrete multi-tone modulation (DMT), or other types of optical signal modulation. Interconnection lengths in such systems are generally less than 120 km, but shorter or longer lengths can be used. The disclosed methods, apparatus, and systems can be used with other modulation formats and other optical fiber communication systems in which chromatic dispersion compensation is desired, including coherent communication systems.

Optical devices that combine optical signal inputs at a plurality of wavelengths so as to propagate on a single fiber are referred to herein as multiplexers or optical multiplexers. These optical multiplexers also divide combined multi-channel beams into individual, separate modulated optical beams and can alternatively be referred to as demultiplexers. Modulated optical beams are occasionally referred to as optical signals. In addition, in the illustrated examples, communication systems that include transceivers are shown for convenient illustration, instead of showing transmitters and receivers independently.

While optical CD compensation can be provided with dispersion compensating fibers that provide CD compensation over a continuous wavelength band, channelized CD compensators can be used that provide CD compensation at WDM channel wavelengths. In some communication systems, wavelength channels (or frequency grids) are specified by the International Telecommunication Union (ITU) or according to other standards or agreements. ITU channel grids include those associated with dense WDM (DWDM) and coarse WDM (CWDM). Some have channel spacings of 12.5 GHz, 25 GHz, 50 GHz, or 100 GHz and in some cases channel wavelengths are specified at wavelengths near 1310 nm and 1550 nm. Analog or optical CD compensation can be provided with optical fibers, fiber Bragg gratings, etalons, or liquid-crystal-on-silicon (LCoS) devices.

Chromatic dispersion in optical fibers is generally a function of the variation in refractive index of optical fiber materials (material dispersion) as well as variations in waveguide properties as a function of wavelength (waveguide dispersion). Fiber chromatic dispersion is conveniently characterized by a chromatic dispersion coefficient D associated with pulse temporal spreading per wavelength and per fiber length. Pulse spread $\Delta\tau$ due to propagation of a pulse having a wavelength spread $\Delta\lambda$ in an optical fiber of length L and having a chromatic dispersion coefficient D is given by $\Delta\tau=|D|L\Delta\lambda$. Typically, pulse spreading due to fiber chromatic dispersion can be considered to be a linear function of pulse spectral width and fiber length, but other variations are possible. The dispersion coefficient D can be a function of wavelength as well. Chromatic dispersion coefficients D can be positive or negative depending on fiber design, but D is generally positive for standard single mode fibers at about 1550 nm. Dispersion shifted fibers can have D=0 at a design wavelength, and negative dispersion fibers can have D<0 at a design wavelength. Combining fibers with positive and negative dispersion coefficients can permit reduction or elimination of chromatic dispersion, but such dispersion compensation is invariable after installation. While negative dispersion optical fibers can be used in chromatic dispersion compensation, other optical devices can be used. For example, fiber Bragg grating devices can provide suitable total dispersions.

As used herein, signal or optical signal such as a communication signal refers to a time varying optical beam that is generally contained in and guided by a waveguide such as an optical fiber. OTDR signals are typically pulses and can be referred to as probe pulses. As used herein, an OTDR comprises a pulses source and a detection system that detects returned portions of probe pulse and determines associated time delays, or in some example, associated fiber lengths. Communication signal generally refers to an optical signal modulated to communicate data. For convenient explanation, DWDM multiplexed signals are used for illustration.

With reference to FIG. 1, a representative optical communication system 100 includes a first network node 102 and a second network node 142 coupled by optical fibers 104, 106. The first network node 102 includes optical transceivers $110_1, \ldots, 110_N$ that are coupled to a mux/demux 112 (or an optical switch) so that wavelength division multiplexed or other combined optical beams are communicated between the mux/demux 112 and an optical line system (OLS) 114 that is coupled to the optical fibers 104, 106. An optical supervisory channel (OSC) 116 is coupled to the optical line system 114 so that one or more optical signals associated with network control are communicated between the first network node 102 and the second network node 104, typically at wavelengths other than data communication wavelengths. The optical line system 116 typically includes one or more processors, memory, and electrical network connections as well as an optical time domain reflectometer (OTDR) 118 that delivers a probe pulse to the OLS 114 and to one or both of the optical fibers 104, 106. Portions of the probe pulse are reflected and are returned to the OTDR 118. The associated time delay (i.e., round trip propagation time) permits estimation of optical fiber length, and thus permits estimation of fiber chromatic dispersion.

The second network node 142 includes optical transceivers $140_1, \ldots, 140_N$ that are coupled to a mux/demux 143 so that wavelength division multiplexed or other combined optical beams are communicated between the mux/demux 143 and an optical line system 144 that is coupled to the optical fibers 104, 106. An optical supervisory channel (OSC) 146 is coupled to the optical line system 144 so that one or more optical signals associated with network control are communicated between the first network node 102 and the second network node 104. The OSC 146 typically includes one or more processors, memory, and electrical network connections as well as an optical time domain reflectometer (OTDR) 148 that delivers a probe pulse to the optical line system 144 and to one or both of the optical fibers 104, 106. Portions of the probe pulse are reflected and are returned to the OTDR 148. The associated time delay (i.e., round trip propagation time) permits estimation of optical fiber length, and thus permits estimation of fiber chromatic dispersion (CD). Typically, each of the OTDRs 118, 148 are coupled to different optical fibers so that OTDR probe pulses are launched so as to counter-propagate with respect to communication optical signals, but either or both can be connected to either or both of the optical fibers 102, 104. OTDR pulses can be launched as various repetition rates ranging from 0.1 Hz to tens of kHz. A repetition rate can be selected to allow a first pulse to propagate back to the OTDR prior to launching a subsequent probe pulse and pulse durations can be selected to obtain suitable distance resolution, typical pulse durations ranging from 1 μs to about 0.1 ns. In some cases, OTDR signals are applied with or without the presence of communication signals using an optical switch to couple OTDR probe pulses to one or both of the optical fibers 104, 106.

Upon determination of CD, the OSC 116 can be coupled to one or more optical CD compensators 151-155 as shown schematically in FIG. 1. Individual optical CD compensators can be provided for each transceiver at each network location, if desired. Typically, a common configuration is used at all or many network locations. In other examples, electronic (digital) CD compensation is provided as each of the transceivers, but such CD compensation is not illustrated in FIG. 1. In some examples, each of the OSCs 116, 146 include respective processors and memory 119, 147 that determine CD values to be compensated and provide control signals to one or more optical or electronic CD compensators.

Figure 2A:
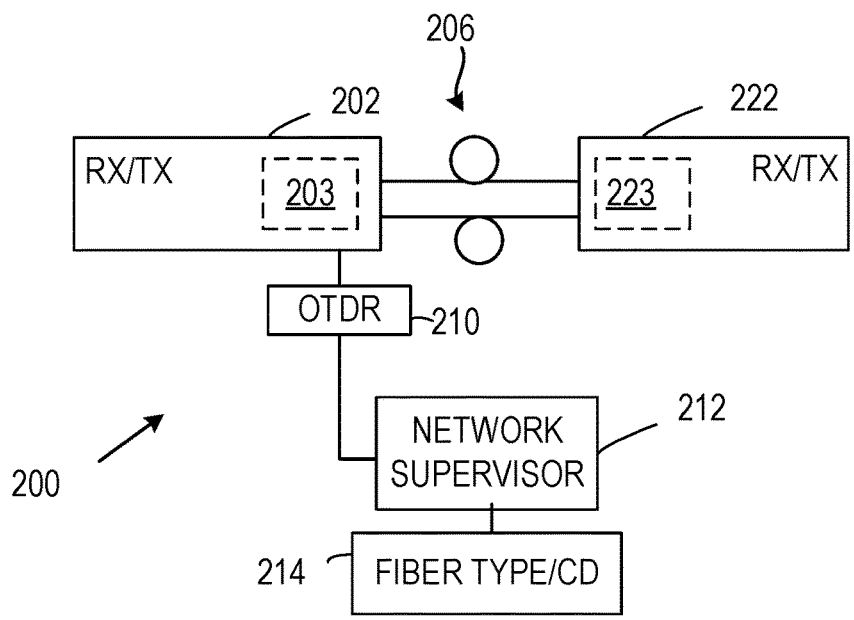
FIGS. 2A-2B illustrate representative optical communication systems that include an optical time domain reflectometer to estimate chromatic dispersion.

Referring to FIG. 2A, an optical communication system 200 includes a first network node 202 and a second network node 222 that include respective optical couplers 203, 223 that combine and separate optical beams among appropriate inputs/outputs of one or more optical transceivers. An optical fiber pair 206 couples the first and second network nodes 202, 222. An OTDR 210 delivers a probe pulse at the network node 202 and the optical coupler 203 combines the probe pulse with the communication optical signals. The probe pulse can be coupled to one or both of the optical fibers of the optical fiber pair 206. The OTDR determines a propagation time to a reflective surface at or near the second network node 222 and can estimate an optical fiber length based on propagation speed in the optical fiber. A network supervisory node 212 or other controller receives the estimated length (or the propagation time) and, if available, retrieves a CD coefficient or other CD information such as propagation speed as a function of wavelength from a memory 214. With this CD information, CD can be estimated for some or all transceiver wavelengths to permit compensation, to provide notice of estimated available bit rates, or permit selection of a modulation format.

Figure 2B:
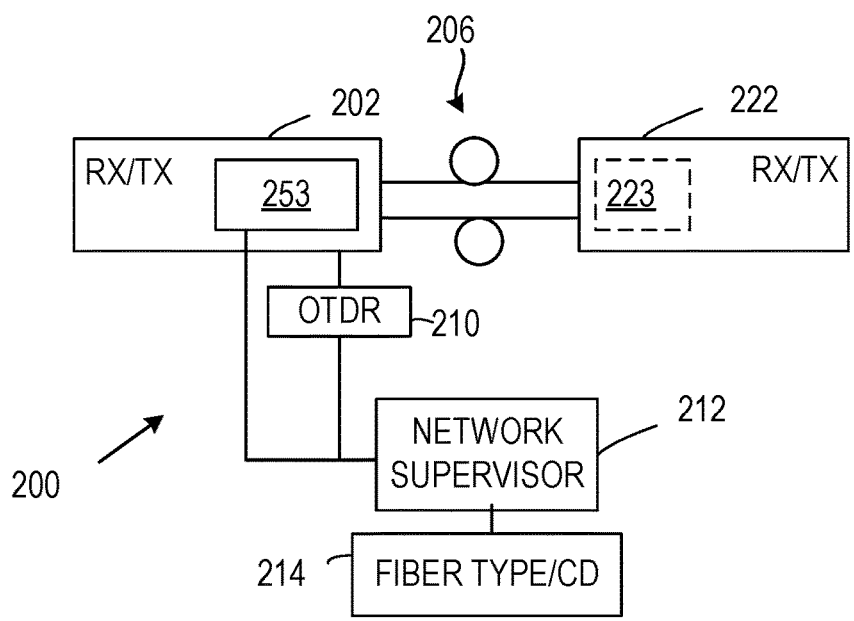

In typical WDM examples, optical signals transmitted and received for optical communication are combined and separated with wavelength dependent optical couplers referred to as WDM multiplexers/demultiplexers. In other examples, passive, wavelength insensitive couplers are used (although often associated with undesirable optical loss) or optical switches that selectively direct one or more optical communication signals to or from a link fiber. In addition, wavelength dependent, wavelength insensitive couplers, or optical switches can be used to introduce and extract OTDR probe pulses from link fibers. As shown in FIG. 2B, an optical switch 253 is used in place of the optical coupler 203 of FIG. 2A. The network supervisory node 212 is coupled to the optical switch 253 so that OTDR pulses can be sent and received during CD measurements based on switch control by the network supervisory node 212. A similar arrangement can be provided for the second network node 222.

Figure 3:
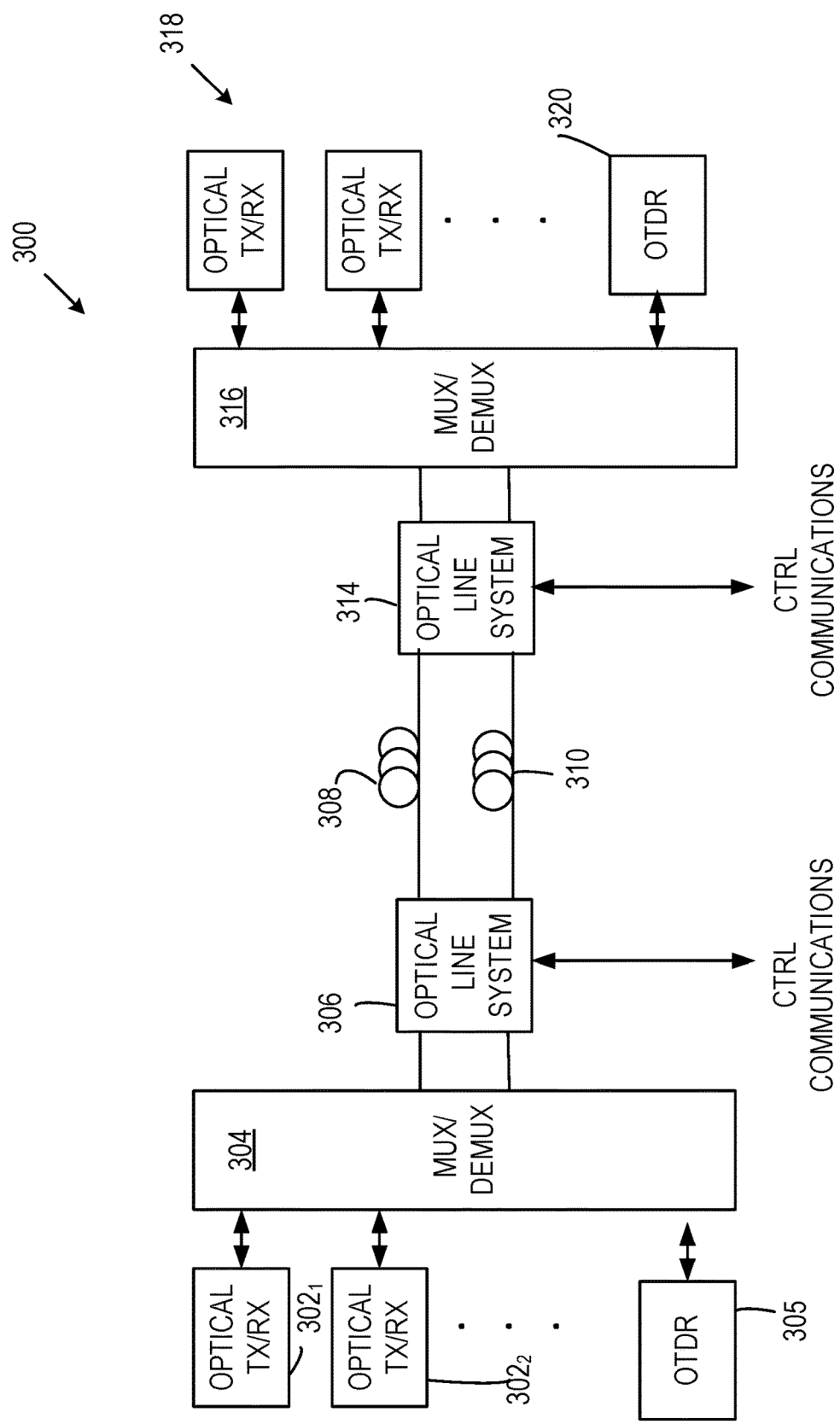
FIG. 3 illustrates a representative optical communication system that includes optical time domain reflectometers to assess fiber lengths and permit chromatic dispersion compensation.

FIG. 3 illustrates an alternative optical communication network 300. Optical transceivers 302₁, 302A, ... are coupled to a mux/demux 304 to produce combined beams for transmission and receive separated optical beams. An OTDR 305 is also coupled to the mux/demux 304 so that an optical line system 306 receives multiplexed beams and an OTDR probe pulse. The probe pulse is directed to one or both of optical fibers 308, 310 for measurement of optical fiber length. At a remote node, combined beams are communicated with an optical line system 314 that also receives the probe pulse. Portions of the probe pulse can be returned to the OTDR 305 from the optical line system 314, a mux/demux 316, or detectors or emitters or other components associated with transceivers 318. As shown in FIG. 3, the remote node includes an OTDR 320 as well, and either or both OTDRs can be used for fiber measurement as convenient.

Figure 4:
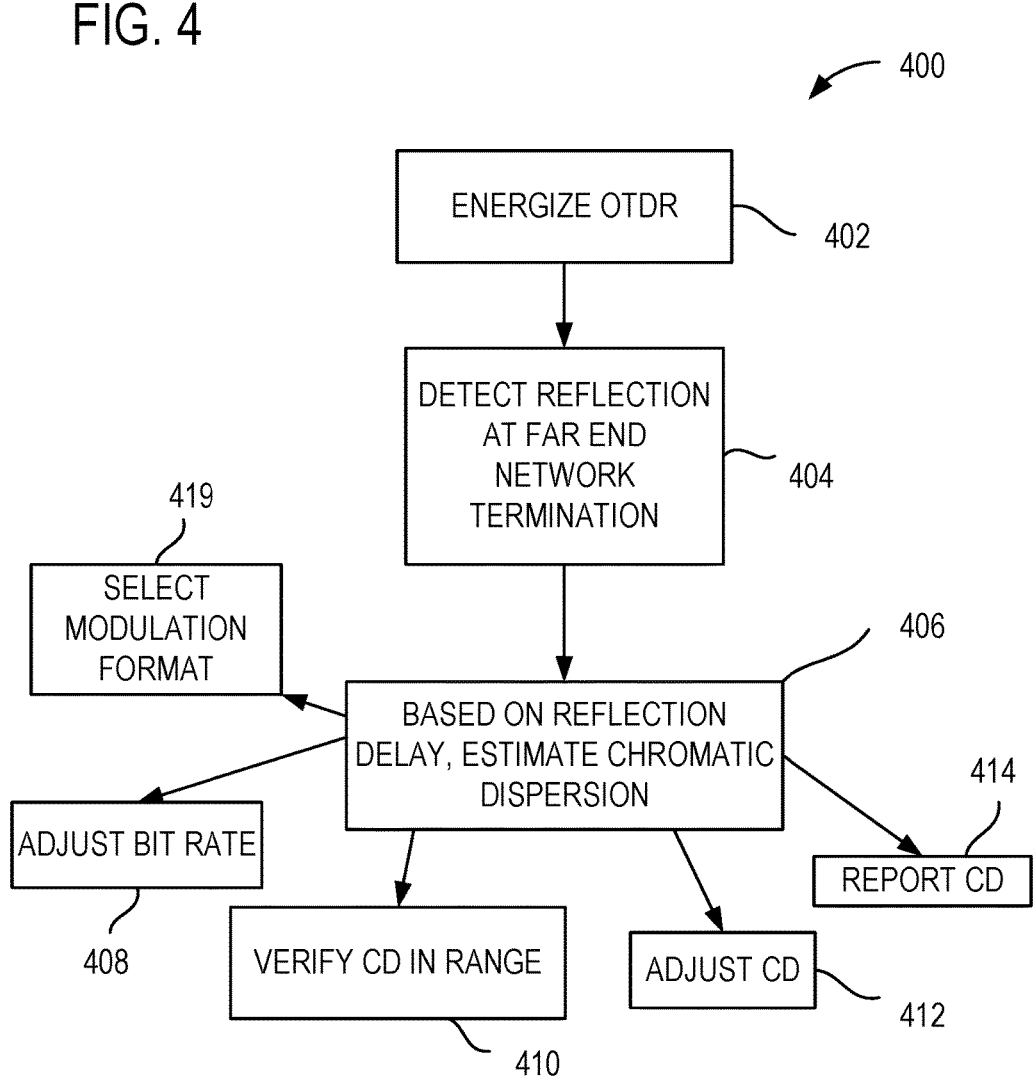
FIG. 4 illustrates a representative method of estimating chromatic dispersion.

With reference to FIG. 4, a representative method 400 includes energizing an OTDR at 402 so that one or more probe pulses are directed into one or more link fibers. In some cases, the OTDR is energized only when there is little or no communication traffic, or only after installation, repairs, or other alterations to one or more link fibers. At 404, a reflected pulse portion or other returned pulse portion is detected at the OTDR, typically from one or more typical network node components. If desired, a reflector, fiber coupler, circulator or other device can be used to produce the returned pulse but in practice this is typically unnecessary. At 406, based on the reflected pulse delay, chromatic dispersion can be estimated for some or all wavelengths of interest based on a fiber length associated with pulse delay. In response, recommended communication bit rates can be determined and reported at 408, the value of CD can be confirmed to be within an acceptable range at 410, CD can be reported via a control network or displayed for a network operator at 414, a suitable modulation format can be selected and communicated to one or more network nodes at 1419, or CD compensation can be introduced at 412 for one or more or all transceivers.

Figure 5:
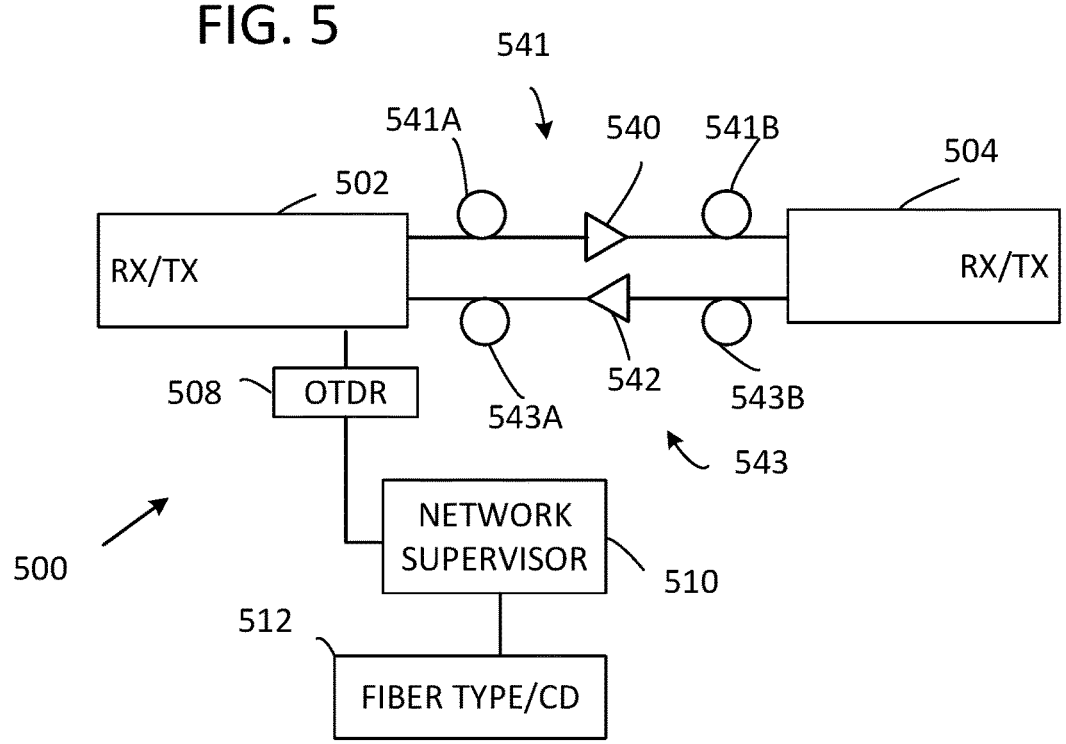
FIG. 5 illustrates a representative optical communication system that includes optical amplifiers.

FIG. 5 illustrates a representative optical communication network 500 that includes a respective optical amplifier 540, 542 at each optical fiber 541, 543. As shown, the optical amplifiers are situated remotely, but other locations can be used. A first network node 502 includes an OTDR 508 that directs probe pulses to either of the optical fibers 541, 543; a second network node 504 can be similar but is not shown in detail in FIG. 5. A network controller 510 receives pulse delays or length estimates from the OTDR 508, and based on fiber type and associated CD coefficient (or CD coefficient as a function of wavelength) from a memory 512, computes an estimate of CD. Probe pulses can typically be propagated in either direction through the optical amplifiers 540, 542. As shown in FIG. 5, each of the optical fibers 541, 543 includes respective first portions 541A, 541B and second portions 543A, 543B. Multiple pulse portions are typically returned, and a most delayed pulse portion associated with total fiber length is used. In some cases, multiple reflections in the fiber can be resolved by identifying apparent pulse delays that are integer multiples. Lengths of fiber portions can be obtained as well and total fiber length.

Figure 6A:
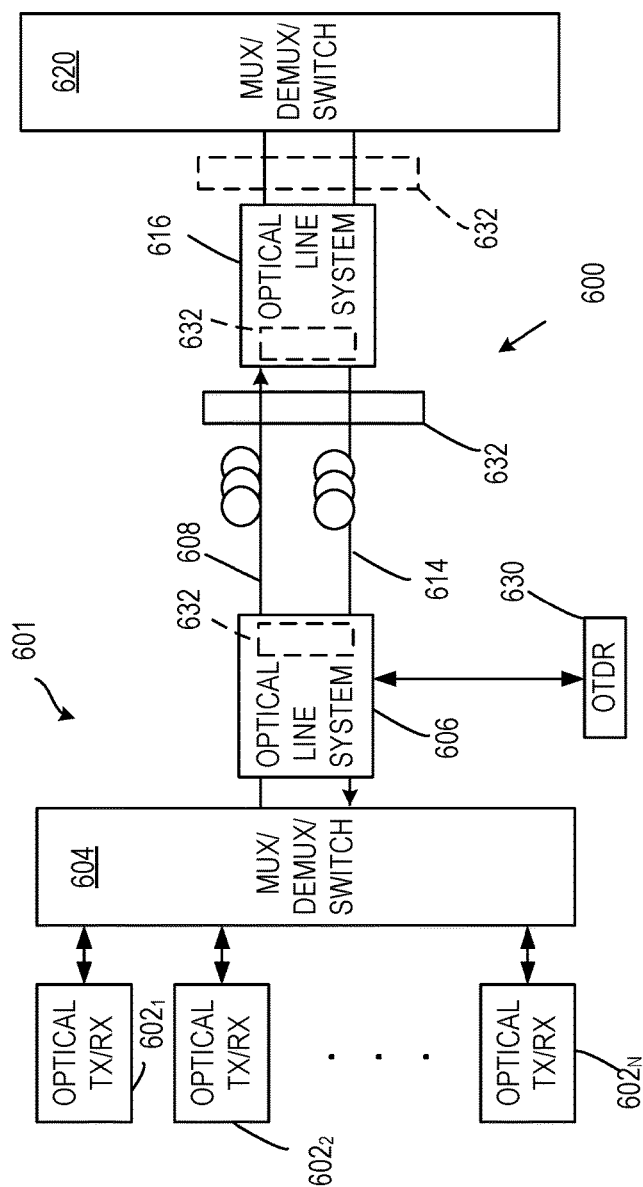
FIG. 6A illustrates an optical communication system that includes a single OTDR for bidirectional CD measurement.

Referring to FIG. 6A, an optical communication system 600 includes a network node 601 that comprises optical transceivers $602_1, \ldots, 602_N$ and a mux/demux 604. Optical communication beams transmitted at the network node 601 are combined by the mux/demux 604 and directed to an optical line system 606 and then to a first optical fiber 608. Typically the mux/demux 604 includes two fiber wavelength division multiplexers, one dedicated to combining multiple optical signals for transmission and the other dedicated to separating received optical signals into individual wavelength channels. A second optical fiber 614 couples received optical signals to the mux/demux 604 (or an optical switch) which directs the demuxed signals to the optical transceivers $602_1, \ldots, 602_N$. At a second network node, the optical fibers 608, 614 are coupled to an optical line system 616 and a mux/demux 620 (or an optical switch). One or more transceivers are generally coupled to the mux/demux 620 but are not shown.

An OTDR 630 is coupled to the optical line system 606 to direct one or more probe pulses to the first optical fiber 608. A pulse reflector 632 is coupled to the first optical fiber 608 and the second optical fiber 614 to direct a portion of the probe pulse from the first optical fiber 608 to the second optical fiber 614. In this way, portions of the probe pulse are returned from the first optical fiber 608 and the second optical fiber 614 and a single OTDR can provide length estimates for both. The pulse reflector 632 can be otherwise located as shown in dashed lines.

Figure 6B:
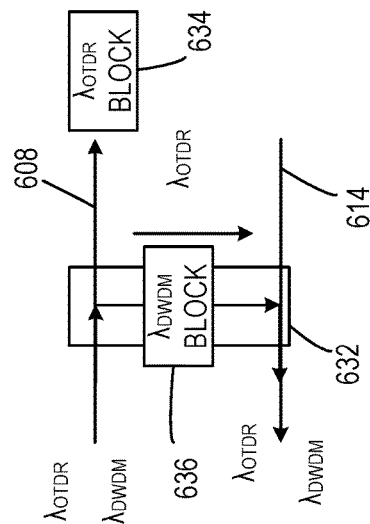
FIG. 6B illustrates the OTDR pulse reflector of FIG. 6A.

Operation of the pulse reflector 632 is illustrated in FIG. 6B. Optical communication signals (for example, DWDM signals denoted as $\lambda_{DWPM}$) and a probe pulse (denoted as $\lambda_{OTDR}$ are directed by to the pulse reflector 632 on the first optical fiber 608. The pulse reflector returns a portion of the probe pulse to the first optical fiber 608 and diverts a portion to the second optical fiber 614. Filters such as filters 634, 636 can be situated to block optical communication signals or probe pulses, if desired. Alternatively, the pulse reflector 632 can be implemented as one or more fiber wavelength division multiplexers to provide wavelength dependent coupling instead of wavelength insensitive optical fiber couplers. With this arrangement, the OTDR 630 can interrogate both optical fibers 608, 614.

A representative method 700 of CD compensation is illustrated in FIG. 7. At 702, an OTDR is energized to produce one or more probe pulses that are directed to a link fiber to be evaluated. At 704, a most distant reflection is identified and associated with a link fiber end. At 708, one or more pulse delays or lengths associated with a most distant reflection and other selected reflections are stored. At 710, CDs associated with one or more reflections is determined based on a fiber CD coefficient or other fiber CD characteristics. CD can be determined at one or more communication wavelengths as needed. At 712, CD compensation is applied at a transmitter or receiver side, or both sides, of an optical communication link. Transceivers can be individually compensated or CD compensation can be applied to a combined beam.

Figure 8A:
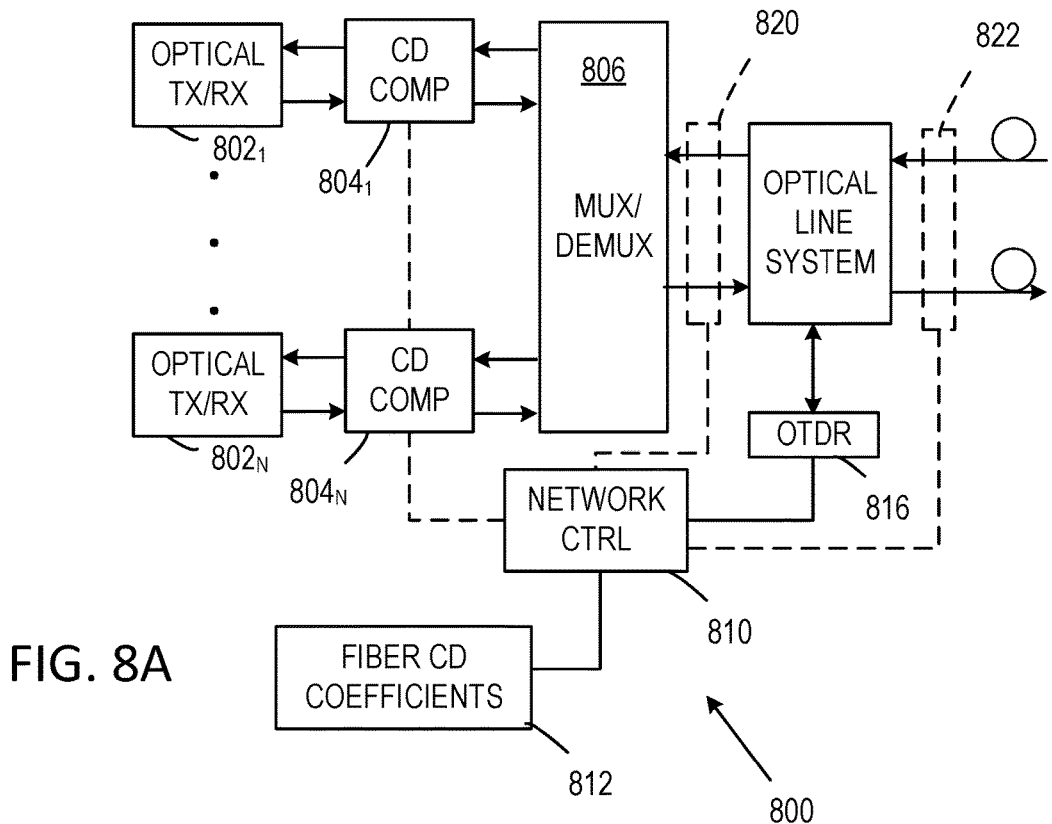
FIG. 8A illustrates a representative optical communication system showing multiple locations for insertion of CD compensation.
Figure 8B:
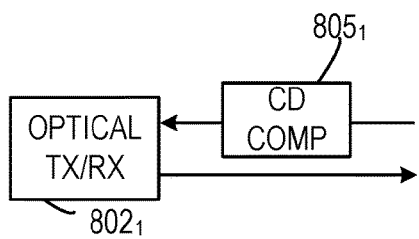
FIG. 8B illustrates CD compensation of a received optical signal.

FIG. 8A illustrates a representative optical communication system 800 that includes CD compensation. Transceivers $802_1, \ldots, 802_N$ are coupled to respective CD compensators $804_1, \ldots, 804_N$ that couple CD compensated beams to and from a mux/demux 806. Each of the CD compensators $804_1, \ldots, 804_N$ can include individual CD compensators for a transmit fiber and a receive fiber. In addition, CD compensation can be provided at only one of a transmit side or a receive side, and CD compensation of both receive and transmit fibers at a common network node can be avoided. For example, as shown in FIG. 8B, a CD compensator 8051 is situated apply CD compensation to received optical communication signals directed to the transceiver $802_1$. CD compensation is typically controlled by a network or node controller 810 based on OTDR propagation times obtained with OTDR 816 and fiber characteristics stored in a memory 812. In other examples, CD compensation is applied to combined beams with CD compensators 820, 822.

Figure 9:
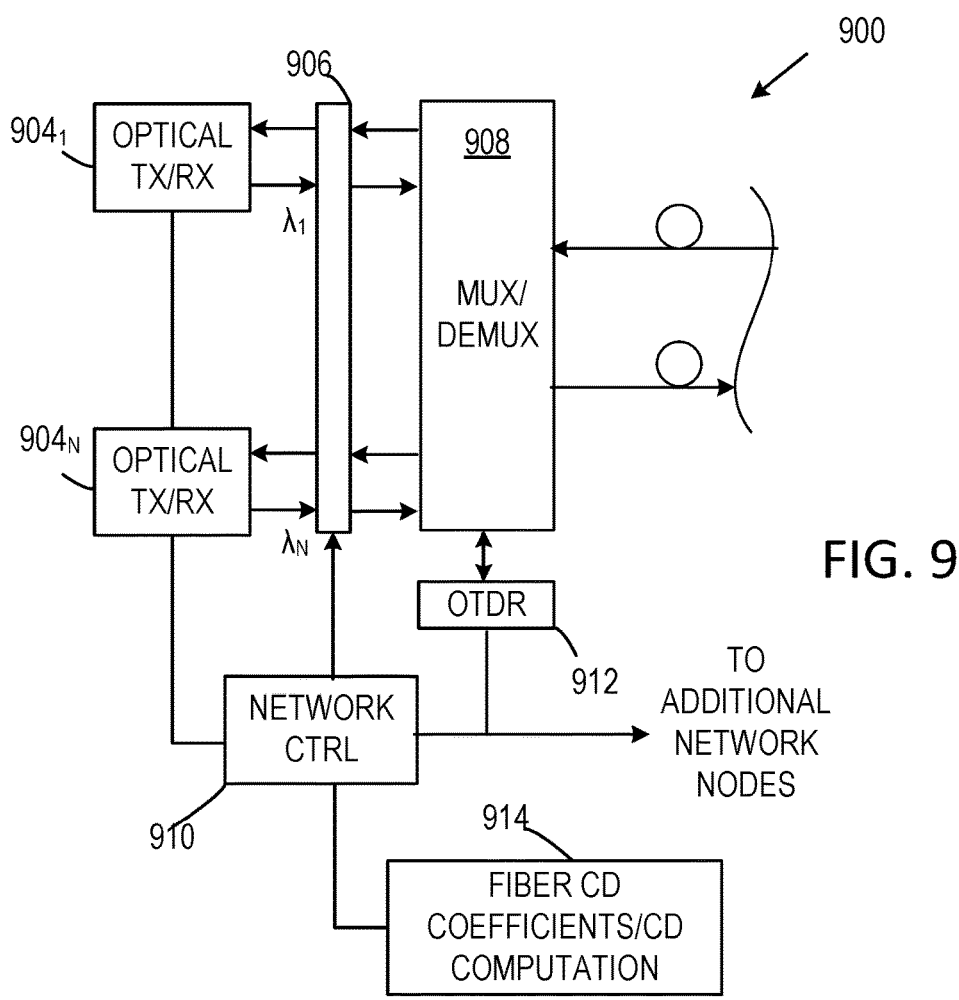
FIG. 9 illustrates an optical communication system that includes a network controller situated to adjust CD compensation at a plurality of network nodes.

In an example shown in FIG. 9, an optical communication system 900 includes transceivers $904_1, \ldots, 904_N$ that transmit and receive optical communication signals at wavelengths $\lambda_1, \ldots, \lambda_N$, respectively. A CD compensator 906 processes signals being transmitted and received as communicated with a mux/demux 908. The CD compensator is controlled by a network controller 910 that is coupled to an OTDR 912 and to additional network nodes (not shown). Optical fiber CD coefficients and other CD characteristics are stored in a memory 914, along with processor-executable instructions for determining suitable CD compensation based on, for example, fiber type, optical communication signal bit rate, and channel wavelength.

Figure 10:
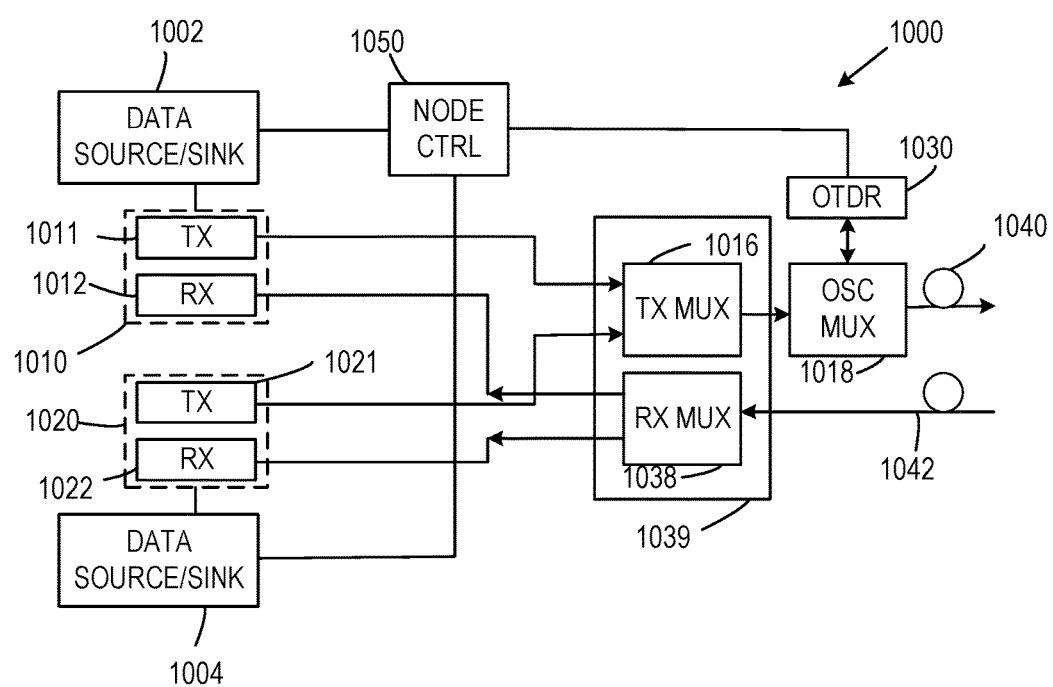
FIG. 10 illustrates another representative optical communication system.

Referring to FIG. 10, data sources/sinks 1002, 1004 are coupled to respective optical transceivers 1010, 1020 that include optical receivers 1012, 1022 and optical transmitters 1011, 1021. The optical transmitters 1011, 1021 are coupled to a transmit mux 1016 to produce a combined beam that is directed to a mux 1018 for combination with a probe pulse from an OTDR 1030. The combined beam and the probe pulse are then coupled to a transmit optical fiber 1040. A combined received optical communication signal on optical fiber 1042 is directed to receive mux (i.e., demux) 1038 that separates the combined signal and delivers portions to the receivers 1012, 1022. Reflected probe pulse portions received at the OTDR 1030 permit estimation of CD, and the node controller 1050 is coupled to the data sources/sinks 1002, 1004 to selected suitable data rates or modulation format consistent with estimated CD. The transmit mux 1016 and the receive demux 1038 can be provided in a mux/demux 1039. While muxes are shown for combining and separating beams, optical switches can be used as well.

Figure 11:
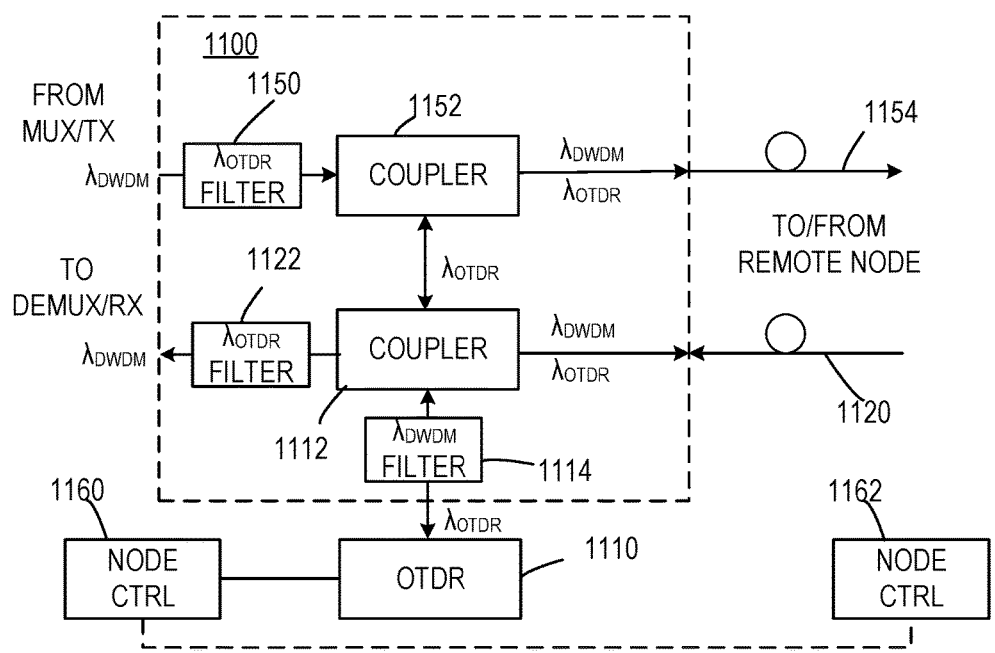
FIG. 11 illustrates another representative optical communication system.

FIG. 11 illustrates an optical assembly 1100 for coupling OTDR probe pulses to and from optical communication signals. An OTDR 1110 is coupled to communicate probe pulses to and from a coupler 1112 through a WDM block filter 1114. The coupler 1112 directs probe pulses to an optical fiber 1120. An incoming combined optical communication signal is directed by the optical fiber 1120 to the coupler 1112 and to an OTDR pulse block filter 1122. With this arrangement, OTDR probe pulses do not reach optical detectors at a receiver and optical communication signals are not inadvertently detected at the OTDR 1110. A similar OTDR pulse block filter 1150 transmits a combined optical communication signal to a coupler that receives portions of the probe pulses from the OTDR 1110. The coupler 1152 directs the combined optical communication signal and probe pulse portions to an optical fiber 1154. OTDR measurements are coupled to a node controller 1160 that is in turn coupled to a remote node controller 1162, typically via an optical supervisory channel (OSC). The node controller 1160 can produce an estimate of CD, communicate the estimate, apply compensation, or control other responses to CD measurement.

Figure 13A:
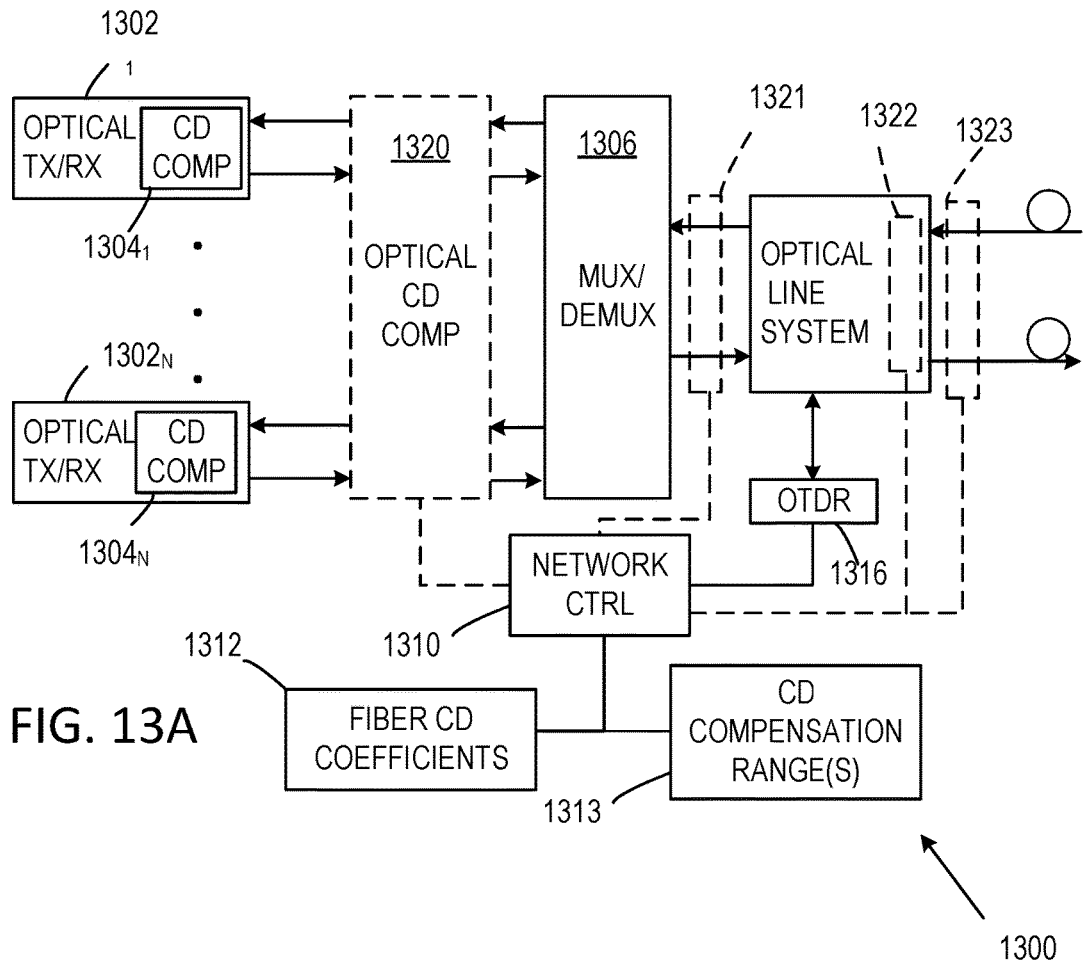
FIGS. 13A-13B illustrate a representative optical communication system showing multiple locations for insertion of optical CD compensators that can be provided in addition to electronic (digital) CD compensation.
Figure 13B:
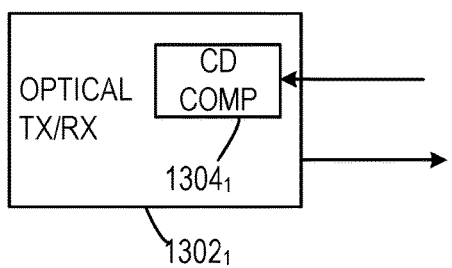

FIG. 13A illustrates a representative optical communication system 1300 that includes digital CD compensation. Transceivers $1302_1, \ldots, 1302_N$ are include (or are coupled to) respective digital CD compensators $1304_1, \ldots, 1304_N$ that CD compensate one or both of transmitted and received communication beams that are coupled to a mux/demux 1306. Each of the digital CD compensators $1304_1, \ldots, 1304_N$ can include individual CD compensators for a transmit fiber and a receive fiber. In addition, CD compensation can be provided at only one of a transmit side or a receive side, and CD compensation of both receive and transmit fibers at a common network node can be avoided. For example, as shown in FIG. 13B, the CD compensator $1304_1$ is situated to apply CD compensation to received optical communication signals directed to the transceiver $1302_1$. CD compensation is typically controlled by a network or node controller 1310 based on OTDR propagation times obtained with OTDR 1316 and fiber characteristics stored in a memory 1312. Optical CD compensators such as CD compensators 1320-1323 can be provided (or can be situated at other locations). In some examples, optical CD compensation is applied to reduce a CD compensation range to be compensated digitally. Reducing the necessary CD compensation range can reduce complexity, size, and power consumption required for digital CD compensation. Suitable ranges can be stored in a memory 1313 for use by the network controller 1310.

Figure 14:
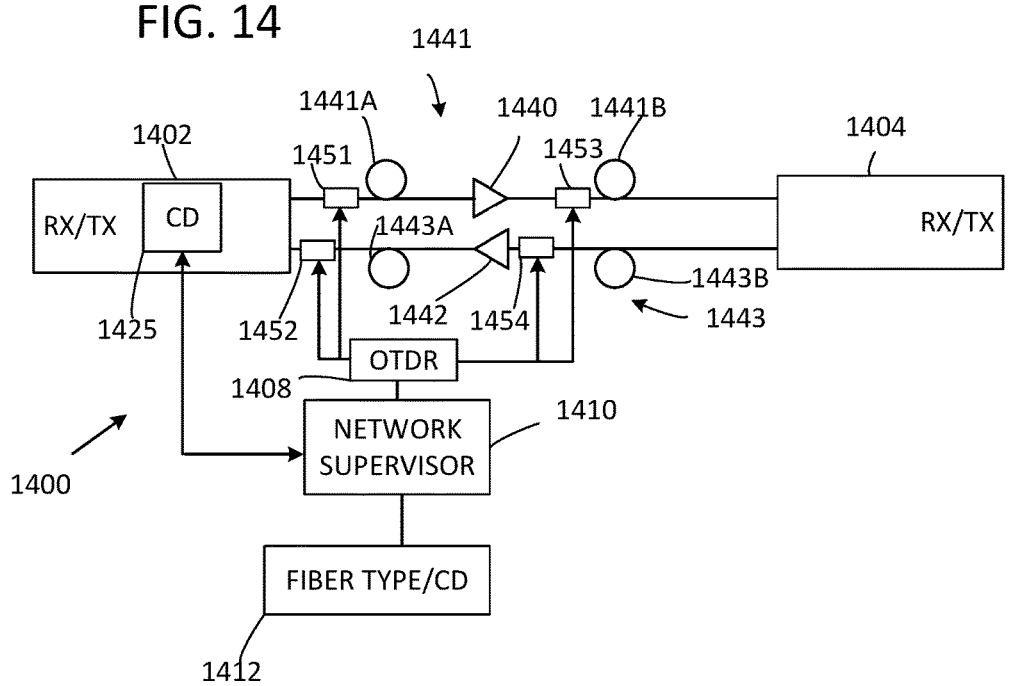
FIG. 14 illustrates a representative optical communication system that includes an OTDR situated to inject probe pulses on both sides of optical amplifiers that are coupled to link fibers.

FIG. 14 illustrates a representative optical communication network 1400 that includes a respective optical amplifier 1440, 1442 at each optical fiber 1441, 1443. As shown, the optical amplifiers are situated remotely, but other locations can be used. A first network node 1402 includes an OTDR 1408 that directs probe pulses to either or both of the optical fibers 1441, 1443; a second network node 1404 can be similar but is not shown in detail in FIG. 14. A network controller 1410 receives pulse delays or length estimates from the OTDR 1408, and based on fiber type and associated CD coefficient (or CD coefficient as a function of wavelength) from a memory 1412, computes an estimate of CD. Probe pulses can typically be propagated in either direction through the optical amplifiers 1440, 1442. As shown in FIG. 14, each of the optical fibers 1441, 1443 includes respective first portions 1441A, 1441B and second portions 1443A, 1443B. Multiple pulse portions are typically returned, and a most delayed pulse portion associated with total fiber length is used. In some cases, multiple reflections in the fiber can be resolved by identifying apparent pulse delays that are integer multiples. Lengths of fiber portions can be obtained as well and total fiber length. In most cases, optical amplifiers such as the optical amplifiers 1440, 1442 do not transmit OTDR probe pulses. As shown in FIG. 14, probe pulses can be injected and received on both sides of the optical amplifiers 1440, 1442 with optical couplers or switches 1451-1454. As discussed above, CD compensation can be provided with one or more optical CD compensators (not show) or with a digital CD compensator 1425. The digital CD compensator 1425 is in communication with the network supervisor 1410 so that the CD compensator 1425 can report a range of CD compensation in use or report success or failure in CD compensation. The network supervisor 1410 can also signal the CD compensator 1425 of a range of CD compensation to be expected. One or more OTDRs can be used, and an additional optical line system can be provided at optical amplifiers.

Figure 12:
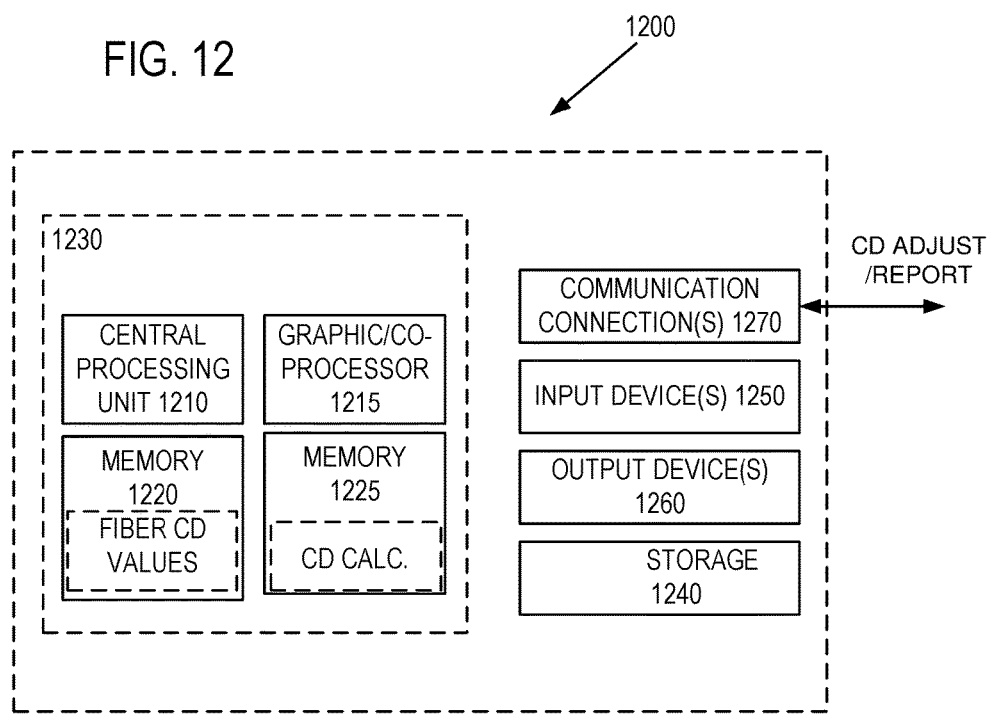
FIG. 12 illustrates a representative computational system and environment for measurement and control of optical communication systems and one or more network nodes.

FIG. 12 depicts a generalized example of a suitable computing environment 1200 in which the described innovations may be implemented. The computing environment 1200 is not intended to suggest any limitation as to scope of use or functionality, as the innovations may be implemented in diverse general-purpose or special-purpose computing systems. For example, the computing environment 1200 can be any of a variety of computing devices (e.g., desktop computer, laptop computer, server computer, tablet computer, etc.), or in dedicated processors implemented for network and network node control.

With reference to FIG. 12, the computing environment 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software implementing one or more innovations described herein, in the form of computer-executable instructions suitable for execution by the processing unit(s).

A computing system may have additional features. For example, the computing environment 1200 includes storage 1240, one or more input devices 1250, one or more output devices 1260, and one or more communication connections 1270. An interconnection mechanism (not shown) such as a bus, controller, or network interconnects the components of the computing environment 1200. Typically, operating system software (not shown) provides an operating environment for other software executing in the computing environment 1200, and coordinates activities of the components of the computing environment 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing environment 1200. The storage 1240 stores instructions for the software implementing one or more innovations described herein.

The input device(s) 1250 may be a touch input device such as a keyboard, mouse, pen, or trackball, a voice input device, a scanning device, or another device that provides input to the computing environment 1200. The output device(s) 1260 may be a display, printer, speaker, CD-writer, or another device that provides output from the computing environment 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

As shown in FIG. 12, fiber CD coefficients and other fiber descriptors as well as network characteristics such as wavelength assignments available or in use are stored in the memory 1220. Computer-executable instructions for identifying reflections and determining CD are stored in the memory 1225. Either can be stored in the storage 1240 or provided via a remote node, and local storage is not required.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

It should also be well understood that any functionality described herein can be performed, at least in part, by one or more hardware logic components or with software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed technology may be applied, it should be recognized that the illustrated embodiments are only examples and should not be taken as limiting in scope. We claim as our invention all that comes within the scope of the appended claims.

What is claimed is:

1. An optical communication system, comprising:
an optical fiber pair;
a first network node coupled to the optical fiber pair, comprising:
a first plurality of optical transceivers, each configured to communicate at a selected wavelength to produce or receive a combined beam for communication via the optical fiber pair,
an optical transceiver coupled to the optical fiber pair to cause a supervisory optical signal to co-propagate with the combined beam,
an optical time domain reflectometer (OTDR) coupled to the optical fiber pair so as to deliver a probe pulse to one fiber of the optical fiber pair and produce an estimate of a fiber distance using a returned portion of the probe pulse,
a node controller coupled to the OTDR and the optical transceiver of the first network node and configured to estimate chromatic dispersion (CD) for the one fiber of the optical fiber pair, and
a first chromatic dispersion compensator coupled to the one fiber of the optical fiber pair, and configured to provide a CD compensation based on the CD estimated at the first network node; and
a second network node coupled to the optical fiber pair, comprising:
a second plurality of optical transceivers, each configured to communicate at a selected wavelength to produce a combined beam or receive corresponding wavelength portions of the combined beam from the first network node so as to communicate via the optical fiber pair,
an optical transceiver coupled to the optical fiber pair to cause a supervisory optical signal to co-propagate with the combined beam,
an optical time domain reflectometer coupled to the optical fiber pair so as to deliver a probe pulse to one fiber of the optical fiber pair and produce an estimate of a fiber distance associated using a returned portion of the probe pulse,
a node controller coupled to the OTDR and the optical transceiver of the second network node and configured to estimate chromatic dispersion for the one fiber of the optical fiber pair; and
a second chromatic dispersion compensator coupled to the one fiber of the optical fiber pair, and configured to provide a CD compensation based on the estimated CD at the second network node.

2. An apparatus, comprising:
a plurality of optical transceivers, each configured to transmit and receive respective optical signals at respective wavelengths via at least one optical fiber;
an optical time domain reflectometer (OTDR) coupled to the at least one optical fiber, wherein the OTDR directs a probe pulse to the at least one optical fiber, receives a returned portion of the probe pulse, and determines a fiber length associated with a temporal delay of the returned portion;
a node controller coupled to the OTDR, wherein the node controller, based on the temporal delay, estimates a chromatic dispersion associated with the determined fiber length; and
an optical chromatic dispersion (CD) compensator coupled to the node controller and configured to establish a CD compensation based on the estimated CD produced by the node controller.

3. The apparatus of claim 2, further comprising a data source coupled to the node controller, wherein the data source is in communication with at least one of the optical transceivers, the data source establishing a data rate or modulation format for the at least one optical transceiver based on the estimated chromatic dispersion.

4. The apparatus of claim 3, further comprising an optical multiplexer, optical switch, or optical coupler situated to optically couple the OTDR to the at least one optical fiber.

5. The apparatus of claim 4, wherein the transmitted signals from the plurality of transceivers and the probe pulse produced by the OTDR are at different optical wavelengths, and the multiplexer that optically couples the OTDR to at least one optical fiber is a wavelength multiplexer.

6. The apparatus of claim 2, wherein the at least one fiber includes a first fiber and a second fiber, wherein each of the plurality of optical transceivers is coupled to transmit respective optical signals on the first fiber and receive respective optical signals from the second fiber, wherein the OTDR is coupled to the first fiber.

7. The apparatus of claim 2, wherein the at least one fiber includes a first fiber and a second fiber, wherein each of the plurality of optical transceivers is coupled to transmit respective optical signal on the first fiber and receive respective optical signals from the second fiber, wherein the OTDR is coupled to the second fiber.

8. The apparatus of claim 2, wherein each of the optical transceivers is coupled to the node controller to communicate at at least one data rate or modulation format based on the estimated CD.

9. The apparatus of claim 2, wherein the at least one optical fiber comprises a first optical fiber and a first optical amplifier and a second optical fiber and a second optical amplifier, the first optical fiber and the second optical fiber coupled to the plurality of transceivers to transmit and receive respective optical signals at respective wavelengths via the first optical fiber and the second optical fiber.

10. An apparatus, comprising:
a plurality of optical transceivers, each configured to transmit and receive respective optical signals at respective wavelengths via at least one optical fiber;
an optical time domain reflectometer (OTDR) coupled to the at least one optical fiber, wherein the OTDR directs a probe pulse to the at least one optical fiber, receives a returned portion of the probe pulse, and determines a fiber length associated with a temporal delay of the returned portion;
a node controller coupled to the OTDR, wherein the node controller, based on the temporal delay, estimates a chromatic dispersion associated with the determined fiber length; and
a first fiber coupler situated to direct portions of the probe pulse from the first fiber to the second fiber so as to produce returned pulse portions associated with the first fiber and the second fiber.

11. An apparatus, comprising:
a plurality of optical transceivers, each configured to transmit and receive respective optical signals at respective wavelengths via at least one optical fiber;
an optical time domain reflectometer (OTDR) coupled to the at least one optical fiber, wherein the OTDR directs a probe pulse to the at least one optical fiber, receives a returned portion of the probe pulse, and determines a fiber length associated with a temporal delay of the returned portion;
a node controller coupled to the OTDR, wherein the node controller, based on the temporal delay, estimates a chromatic dispersion associated with the determined fiber length; and
a memory situated to store CD coefficients for a plurality of optical fiber types, wherein the node controller is coupled to the memory to produce the estimate of CD based on a selected stored CD coefficient and a delay associated with the returned pulse portion.

12. A method, comprising:
directing at least one probe pulse to at least one link fiber;
receiving a reflected portion of the at least one probe pulse returned from the at least one link fiber;
determining a time delay associated with the returned portion of the at least one probe pulse;
estimating chromatic dispersion of the at least one link fiber based on the time delay; and
adjusting a chromatic dispersion associated with the at least one link fiber, wherein the at least one link fiber includes a first link fiber and a second link fiber coupled to a first network node and a second network node, wherein the adjusting the chromatic dispersion includes applying an optical chromatic dispersion compensation based on the estimated chromatic dispersion and a chromatic dispersion compensation range associated with a digital chromatic dispersion compensator.

13. The method of claim 12, further comprising directing the at least one probe pulse to counter-propagate in the at least one link fiber with respect to a propagation direction of an optical communication signal.

14. The method of claim 12, further comprising estimating a link fiber length based on the time delay, and estimating the chromatic dispersion based on the estimated link fiber length.

15. The method of claim 12, further comprising estimating the chromatic dispersion based on a fiber chromatic dispersion coefficient retrieved from a memory.

16. The method of claim 12, further comprising estimating the chromatic dispersion based on a fiber chromatic dispersion coefficient retrieved from a memory and based on an optical communication signal wavelength.

17. The method of claim 12, and further comprising directing the at least one probe pulse to a first end of the first link fiber at the first network node and coupling at least a portion of the probe pulse from a second end of the first fiber at the second network node to a second end of the second fiber at the second network node so as to propagate the probe pulse toward a first end of the second fiber at the first network node.

18. The method of claim 12, further comprising directing portions of the probe pulse from the OTDR to a first end of the first fiber and a first end of the second fiber situated at a network node so as to obtain returned pulse portions at the network node from the first fiber and the second fiber.

\* \* \* \* \*